United States Patent Office 3,298,780
Patented Jan. 17, 1967

3,298,780
PROCESS FOR PREPARING A CRYSTALLINE ZEOLITE
Raymond N. Fleck, Berkeley, Calif., assignor to Union Oil Company of California, Los Angeles, Calif., a corporation of California
No Drawing. Filed Mar. 21, 1961, Ser. No. 97,135
10 Claims. (Cl. 23—113)

This invention relates generally to new synthetic crystalline zeolites. More particularly, this invention is concerned with a novel synthetic crystalline form of potassium aluminum silicate and an improved method for producing this silicate and its derivatives. The synthetic zeolite of this invention is hereinatfer called "zeolite UJ."

A number of natural and synthetic crystalline zeolites are known which have interstitial spaces of a size which allow the entry of relatively large molecules. These spaces are usually filled initially with water of hydration which, when removed by partial dehydration, activates these crystalline zeolites as adsorbents. In many cases, such zeolitic adsorbents accept only molecules of a certain size or shape, while rejecting others of a different configuration, thus acquiring the name of "molecular sieves." Certain of these zeolites have also been found to have catalytic properties which are invaluable in chemical processing, and particularly in hydrocarbon conversion. As the number of available synthetic zeolites increases there is, of course, a greater opportunity for selecting a specific zeolite which has the optimum properties for a particular use. A crystalline zeolite can be identified and distinguished from other zeolites by characteristic crystal structure, or composition, or both. X-ray powder diffraction patterns have been found particularly useful in distinguishing the crystalline zeolites, one from the other.

It is, therefore, an object of this invention to provide a new synthetic crystalline alumino silicate.

It is an additional object of this invention to provide a new synthetic crystalline zeolite.

It is a further object of this invention to provide a new synthetic crystalline adsorbent.

It is another object of this invention to provide a new synthetic crystalline alumino silicate catalyst.

A further object is to provide a convenient and effective process for preparing the new crystalline alumino silicate of this invention.

Other and related objects will be apparent from the detailed description of the invention, and various advantages not specifically referred to herein will be apparent to those skilled in the art on employment of the invention in practice.

I have now found that a new alumino silicate, zeolite UJ, can be formed by combining a particular potassium UJ, alumino silicate mixture in a water solution and heat aging at elevated temperatures. Any suitable heating apparatus can be used such as an electric oven, a sand bath, an oil bath, a steam bath, an autoclave, or the like. A preferred process embodiment comprises heating for a suitable time an appropriate aqueous solution of the oxides, or of materials whose chemical compositions can be represented as mixtures of the oxides of potassium, aluminum, and silicon at a temperature between about 150° F. and about 325° F., and preferably in the range of 170° F.–200° F., for a period of at least one hour, but usually between about 10 hours and about 300 hours, and occasionally up to 500 hours or longer.

In making zeolite UJ, a convenient method of preparing the reactant solution is to react aluminum metal with potassium hydroxide dissolved in a part of the water required for the reaction mixture. A second solution comprising potassium silicate and the remainder of the reaction water is then added to the solution containing the potassium aluminate. When the potassium alumino silicate reactants are first combined at room temperature, there is often no precipitate, and in these cases it has been found that only after prolonged aging at elevated temperatures does a precipitate form. The potassium form of zeolite UJ can be produced from reaction mixtures whose compositions, expressed as mole ratios of the oxides, usually fall within the following ranges:

$SiO_2/Al_2O_3$ of from about 6 to about 30
$K_2O/SiO_2$ of from about 0.30 to about 0.70
$H_2O/K_2O$ of from about 80 to about 140

A preferred reaction mixture composition is as follows:

$SiO_2/Al_2O_3$ of from about 7 to about 21
$K_2O/SiO_2$ of from about 0.45 to about 0.65
$H_2O/K_2O$ of from about 95 to about 120

The reactants for making the zeolite UJ of this invention can come from any suitable source such as the following: gamma alumina, potassium aluminate, activated alumina, alumina trihydrate, and the like for alumina; silica gel, potassium silicate, silic acid, and the like for silica; and potassium hydroxide, potassium silicate, and the like for potassium.

After heat aging for a suitable time, the crystalline zeolite UJ is separated from the reactant solution by any suitable means such as filtering, settling, centrifuging, or the like, but preferably by filtration. The separated solids (crystalline zeolite UJ) are then rinsed with water, preferably distilled water, to remove occluded and included reactant materials. Usually the zeolite UJ crystals are washed until the pH of the wash water in equilibrium with the crystals is between a pH of about 9 and a pH of about 12, and preferably a pH of about 10. Insufficient washing leaves reactant materials associated with the crystals while excessive washing removes a portion of the exchangeable cation, in this case potassium, thus lowering the $K_2O/SiO_2$ ratio in the crystal below that normally obtained. Excessive washing forms an exchanged hydrogen form of zeolite UJ by displacement of a portion of the exchangeable cation with hydrogen. The washed solid zeolite UJ can then be air dried conveniently by passing air through the washed filter cake. The zeolite UJ crystals can also be dried by placing in a vented oven at a temperature typically between about 100° F. and 200° F. for a sufficient period of time to dry the crystals.

The crystalline zeolite UJ can be partially dehydrated, thus activating the zeolite for use as an adsorbent, by calcining, usually in air, at a temperature of between about 220° F. and about 1,000° F. This partial dehydration provides an active adsorbent material useful for separating mixtures of materials, one from the other, by selective adsorption. Preferably, the temperature used in dehydrating is somewhere between about 300° F. and about 600° F. The use of calcining temperatures substantially above 1,000° F. causes the crystal structure to collapse, thus destroying the distinctive characteristics of zeolite UJ. Also, if desired, subatmospheric pressure can be used in dehydration, but usually atmospheric calcining is preferred. The resulting crystalline zeolite UJ, from either air drying or calcining, is usually a fine powder. This zeolite UJ powder, upon examination with an electron microscope, appears to have a nearly cubic external crystal shape with the crystal size usually ranging upward from about 0.05 micron. This crystalline zeolite UJ can be used either as the powder or in any suitable form which best suits the particular process application, e.g., in a pelleted or extruded form wherein the zeolite UJ crystal particles are held together with a suitable bonding material such as clay.

The generalized distinguishing composition found for crystalline zeolite UJ can be expressed stoichiometrically as mole ratios of the oxides, as follows:

$$0.9 \pm 0.2 R_{2/v}O : Al_2O_3 : 5.0 \pm 1.5 SiO_2 : wH_2O$$

wherein R designates at least one exchangeable cation, $v$ is the valence of R, and $w$ can be any value from about 0 to about 5. The crystal structure or physical properties of zeolite UJ are not appreciably changed by small variations in the mole ratios of the oxides as set forth in the above formula. The value of $w$ depends upon the degree of zeolite dehydration, and upon the exchangeable cation in the crystal structure. Since the many exchangeable cations vary widely in size, and since the crystal lattice dimensions of the zeolite are substantially inflexible, more or less interstitial space is available to hold water molecules depending upon the exchangeable ion in the crystal lattice.

Typical methods of preparations of zeolite UJ are illustrated in the following Examples I, II, and III.

Example I

In this preparation of crystalline potassium zeolite UJ, a potassium silicate solution was prepared by adding to 350 ml. of distilled water, a 130 ml. portion of potassium silicate having the following composition in weight percent: 12.45 percent $KO$; 26.20 percent $SiO_2$; and 71.35 percent $H_2O$. A second solution was prepared which contained 350 ml. of distilled water, 25 grams of potassium hydroxide (85 percent by weight KOH; 15 percent by weight $H_2O$), and 3.0 grams of aluminum metal (30 mesh). Both of the above solutions were prepared at room temperature. These two reactant solutions were then combined in a one liter glass flask at room temperature and agitated for homogeneity. This gave a reactant mixture composition, expressed in terms of mole ratios of oxides, as follows:

$SiO_2/Al_2O_3$ of about 14.1
$K_2O/SiO$ of about 0.55
$H_2O/K_2O$ of about 106

There was no precipitate nor any evidence of a gel or solid formation upon the mixing of the two solutions. This reactant mixture was then set in an oven for heat aging at a temperature of about 180° F. for a period of about 120 hours. The heat aged reactant mixture was then removed from the oven and set aside, allowing the crystals to settle. Approximately 80 to 90 percent of the reactant mother liquor was then decanted from the settled crystals and discarded. The remaining settled crystals and associated mother liquor were then filtered through a filter paper on a conventional Büchner funnel, thus separating the zeolite UJ crystals from the remaining mother liquor. The crystalline product was then removed from the Büchner funnel and separately slurried with 2,500 ml. of distilled water at room temperature. The crystalline zeolite UJ was then separated from this water wash by filtering once again through a filter paper on a Büchner funnel. This washed crystalline product was then air dried in place on the funnel, removed from the Büchner funnel, placed on a watch glass, and dried in an oven at 700° F. for 1.5 hours. The potassium zeolite UJ crystal, prepared as above, was found to have the following approximate analysis, expressed in terms of mole ratios of oxides, on a water free basis:

$$1.0 K_2O : 1.0 Al_2O_3 : 6.0 SiO_2$$

An X-ray analysis of the calcined zeolite UJ gave a powder diffraction pattern as set forth below in Table 1.

Example II

In this preparation of zeolite UJ, a first solution was prepared comprising 25 grams of potassium hydroxide (85 percent by weight KOH; 15 percent by weight $H_2O$), 3 grams of aluminum, and 350 ml. of distilled water. A second solution was prepared comprising 350 ml. of distilled water and 130 ml. of potassium silicate (12.45 percent by weight $K_2O$; 26.20 percent by weight $SiO_2$; 71.35 percent by weight $H_2O$). These two solutions were then combined in a one liter glass flask at room temperature, but there was no immediate precipitate. This reactant mixture was placed in an oven at 190° F. for heat aging and in 2 hours the mixture of the two solutions had formed a gelatinous precipitate. The reactant mixture was left in the oven at 190° F. for a total of about 44 hours. At the end of this 190° F. heat aging period the gelatinous material was transferred to a closed bomb and placed in an oven at about 317° F. The bomb containing the reactant mixture was agitated occasionally over a period of about 22 hours. The bomb was then removed from the oven and cooled under water until it could be handled conveniently. The crystalline zeolite slurry from the bomb was then filtered through a Büchner funnel, separating the crystals from the reactant mother liquor. The crystalline zeolite UJ, deposited on the filter paper in the Büchner funnel, was then washed, in place, three consecutive times using approximately 1,000 ml. of distilled water in each washing. The washed crystalline product was then placed in an oven for drying at about 200° F. This oven dried crystalline product was then calcined in a furnace at about 700° F. for about 2 hours. The crystalline zeolite UJ was ground for uniformity and a representative sample yielded an X-ray powder diffraction pattern as set forth below in Table 2.

Example III

As a further illustration of the production of the potassium form of zeolite UJ, typical runs 1–14 are tabulated below. These crystal preparation runs were conducted in essentially the same manner as set forth above in Example I except the oven for heat aging was at a temperature between about 190° F. and about 200° F. All of the reaction mixtures commonly comprised 700 ml. of distilled water and 130 ml. of potassium silicate (12.45 percent by weight $K_2O$; 26.20 percent by weight $SiO_2$; and 71.35 percent by weight $H_2O$), but the amount of aluminum metal and the amount of potassium hydroxide varied from run to run as did the aging time.

| Run No. | Aluminum Metal, grams | Potassium Hydroxide (85% KOH; 15% $H_2O$), grams | Approximate Heat Aging Time (190° F.–200° F.), hours |
|---|---|---|---|
| 1 | 6 | 20 | 330 |
| 2 | 6 | 30 | 330 |
| 3 | 5 | 20 | 290 |
| 4 | 5 | 30 | 290 |
| 5 | 4 | 20 | 410 |
| 6 | 4 | 30 | 410 |
| 7 | 3.5 | 20 | 260 |
| 8 | 3.5 | 30 | 260 |
| 9 | 3 | 20 | 240 |
| 10 | 3 | 30 | 240 |
| 11 | 2.5 | 20 | 190 |
| 12 | 2.5 | 30 | 190 |
| 13 | 2 | 20 | 290 |
| 14 | 2 | 30 | 290 |

All of the above runs 1–14 produced crystalline potassium zeolite UJ having the typical diffraction pattern shown below in Table 5, and compositions which fit the general composition equation (discussed above):

$$0.9 \pm 0.2\ R_{2/v}O : Al_2O_3 : 5.0 \pm 1.5\ SiO_2 : wH_2O$$

Most crystalline alumino silicates are based on a framework of linked tetrahedra similar to those of the various forms of silica, but involving aluminum ions with co-ordination number four as well as silicon ions. The oxygen ions are common to an aluminum and a silicon tetrahedra according to the electrostatic valence rule. It is thus necessary that large cations, usually the univalent or bivalent cations such as the alkali or alkaline earth ions, are present to the extent of one alkali ion or one-half of an alkaline earth ion for every quadricoordinant aluminum ion. This requirement of the electrostatic valence rule is substantiated by the formulas of the zeolites, feldspars, and other alumino silicates with tetrahedral frameworks. In all of these alumino silicate crystals, the ratio of the number of oxygen atoms to the number of aluminum atoms and silicon atoms is two to one as required for a complete tetrahedral framework. The tetrahedral framework crystals often have the property of permitting the cations, such as the alkali and alkaline earth ions, to be interchanged by ion exchange with others in an exchange solution. Furthermore, the water molecules can also be removed and replaced by other molecules without the destruction of the crystal. Thus, there are distinct sites available within the interior of the crystal for occupancy by large exchangeable cations or water molecules.

Although there are many exchangeable cations that can exist in zeolite UJ, it is preferred to synthesize the crystal as the potassium zeolite. The potassium can then be replaced by other exchangeable cations, as will be shown below, thereby yielding isomorphic crystalline forms of zeolite UJ. In addition to the potassium form of zeolite UJ, made from the potassium-aluminum-silicate-water system with potassium as the exchangeable ion, there are many other crystalline materials which are isomorphic with the potassium form of zeolite UJ that can be obtained by partial or complete replacement of the potassium ion with other cations. The exchangeable ions which can be used to replace the potassium ion include monovalent, divalent, trivalent, and tetravalent ions including ions of the metals in Group I of the Periodic Table such as silver, lithium, sodium, etc.; ions of the metals in Group II such as strontium, calcium, barium, zinc, magnesium, etc., ions of the transitional elements such as those whose atomic numbers are from 21 to 28, from 39 to 46, and from 72 to 78 inclusive and include iron, cobalt, nickel, manganese, titanium, scandium, vanadium, chromium, yttrium, uranium, osmium, iridium, zirconium, niobium, molybdenum, rhodium, platinum, hafnium, tantalum, tungsten, ruthenium, palladium, and the like; and other ions such as ammonium, hydrogen, and the like, all of which replace the potassium ions without any substantial change in the zeolite UJ crystal lattice. The Periodic Table referred to above is set forth in Handbook of Chemistry, Lange, Ninth Edition, pages 54 and 55.

Since the crystal lattice of zeolite UJ is substantially unchanged by either partial or total exchange of the potassium ion by other cations, the X-ray diffraction patterns of the isomorphic forms of zeolite UJ show the same principal lines as those shown in Table 5 below. However, there are occasionally some differences in the relative intensities and locations of the X-ray lines in these isomorphic crystals because of the different cation sizes. Thus, the appearance of a few minor lines and the disappearance of others from one cation form of zeolite UJ to another, as well as some slight change in the intensities and positions of some of the X-ray lines, can be attributed to the different sizes and numbers of cations present in the various forms since these differences usually produce some expansion or contraction of the crystals.

Zeolite UJ can be converted into substantially isomorphic crystal forms by exchanging the exchangeable cation present in a zeolite UJ crystal with other cations using conventional ion exchange techniques. In such exchange operations with zeolite UJ, usually at least about 20 percent, and preferably 50 to 80 percent of the exchangeable cation, usually potassium, is replaced by another cation. One way to perform this cation exchange is, for example, to contact a potassium zeolite UJ with a water solution of a soluble solid of the cation to be introduced into the zeolite UJ crystal. Fresh solution is continually contacted with the zeolite UJ crystal until the desired extent of ion exchange has taken place. To obtain calcium exchange, a water solution of calcium chloride is suitable, and for lithium, sodium, zinc, magnesium, ammonium, barium, and the like, aqueous solutions of the sulfates, nitrates, chlorides and the like of these cations can be utilized. Other solvents rather than water can be used to give an exchange solution of the desired cation if it is more convenient. The synthesis of the hydrogen zeolite UJ can be carried out by ion exchange removal of the metal cation, e.g., potassium, in the zeolite UJ crystal by contacting the zeolite UJ crystals with either organic or mineral acids, usually in a water solution, such as acetic acid, formic acid, hydrochloric acid, sulfuric acid, nitric acid, and the like. Examples IV and V below illustrate typical cation exchanges of zeolite UJ.

*Example IV*

In this cation exchange, 28.0 grams of powdered potassium zeolite UJ, obtained as described above in Example I, was mixed with an aqueous solution comprising 63.2 grams of ammonium nitrate in 400 ml. of water with 150 ml. of concentrated ammonium hydroxide. This ammonium exchange solution and the 28 grams of potassium zeolite UJ were agitated at room temperature for about 13 minutes. The partially exchanged zeolite UJ was then allowed to settle and the spent ion exchange solution was decanted from the zeolite UJ crystals. An additional volume of exchange solution, comprising 49.8 grams of ammonium nitrate, 100 ml. of concentrated ammonium hydroxide, and 400 ml. of water, was then added to the partially ion exchanged zeolite UJ. This mixture was then stirred for 9 minutes and once again the spent ion exchange solution was decanted after allowing the crystalline zeolite UJ to settle. A third volume of ammonium exchange liquid comprising 50.7 grams of ammonium nitrate, 150 ml. of concentrated ammonium hydroxide, and 400 ml. of $H_2O$ was then added to the decanted zeolite UJ remaining from the second ion exchange treatment. This new mixture was then stirred for 12 minutes. The zeolite UJ and the exchange solution from this final ion exchange was then poured onto a Büchner funnel, thus separating the ammonium zeolite UJ crystals from the spent ammonium exchange solution. The exchanged crystalline zeolite UJ was then washed with about 1,000 ml. of water at room temperature and allowed to air dry by continuing suction on the Büchner funnel. An analysis of this ammonium zeolite UJ showed that ammonium ions had replaced approximately 60 percent of the potassium ions originally present in the potassium zeolite UJ.

A 3.6 gram portion of this ammonium ion exchanged zeolite UJ was then heated for 1.5 hours at 700° F. in a calcining oven to decompose the ammonium UJ and forming what was believed to be hydrogen UJ. The hydrogen UJ form was stable under its conditions of formation (700° F. calcination of the ammonium UJ) as evidenced by the fact that the crystal lattice did not collapse, i.e., retaining substantially the same X-ray diffraction pattern (Table 3 below) as shown by the original potassium zeolite UJ (Table 1 below). Similar results can be obtained in the process of Example IV when ammonia is replaced with other ammonia type compounds such as hydrazine, pyridine, aniline, hexylamine, and the like.

*Example V*

An ion exchange solution, comprising 12 percent by weight of calcium nitrate $(Ca(NO_3)_2 \cdot 4H_2O)$ dissolved in water, was prepared for replacing the potassium cation with the calcium ion in a sample of potassium zeolite UJ obtained as described above in Example I. Approximately 3 liters of this calcium nitrate solution was passed through a 10 gram bed of the potassium zeolite UJ for about 20 hours. Then about 1 liter of distilled water was passed through the bed in 2 hours to wash the product. The ion exchanged product was dried at 250° F. before calcining. The product was then calcined at 700° F. to obtain a powdery crystalline calcium exchange zeolite UJ which, when analyzed, showed that approximately 72 percent of the potassium ions originally present in the potassium zeolite UJ had been replaced by calcium ions. Other cations such as barium, strontium, lithium, zinc, magnesium, sodium, cerium and the like, exchanged for the potassium cation in the manner set forth in Examples IV and V, yield zeolite UJ crystals having essentially the same significant major X-ray diffraction lines as found with all zeolite UJ crystals (Table 5 below).

The zeolite UJ has been found to have a particularly distinguishable X-ray powder diffraction pattern as compared to other zeolites and other crystalline substances. Thus, these X-ray diffraction patterns represent one of the most effective means of identifying the zeolite UJ crystal. The X-ray diffraction patterns for the zeolitic material prepared in Examples I–V are typical of those obtained from zeolite UJ powders and are set forth below in Tables 1–5. In obtaining the patterns of Tables 1, 2, 3 and 4, samples of material from Examples I, II, IV and V, respectively, were used. A Geiger counter spectrometer with a strip chart pen recorder was used to obtain the data of Tables 1, 3 and 4. The radiation source was either the K-alpha doublet of cobalt for Tables 1 and 3, or the K-alpha doublet of copper for Table 4. The relative intensities, 100 $I/I_o$, were obtained by taking the peak heights, I, from the spectrometer chart and comparing them with the intensity of the strongest peak, $I_o$. The peak positions, as a function of $2\theta$, where $\theta$ is the Bragg angle, were also obtained from the chart. The interplanar spacings in Angstrom units, $d(A.)$ observed, corresponding to the recorded peaks, were then determined.

Table 2 is a tabulation of the X-ray diffraction pattern of potassium zeolite UJ obtained by conventional X-ray powder photographic techniques. The Bragg angles, the $d(A.)$ observed, and the relative intensities were determined from the photographic film diffraction pattern, obtained with a cobalt K-alpha doublet radiation source, of a sample of the crystalline zeolite UJ prepared in Example II.

TABLE 1.—POTASSIUM ZEOLITE UJ (EXAMPLE I)

| Bragg Angle, $2\theta$ | Interplanar Spacing, $d(A.)$ | Relative Intensity, 100 $I/I_o$ |
|---|---|---|
| 6.34 | 16.17 | 100 |
| 13.57 | 7.57 | 15 |
| 17.00 | 6.05 | 17 |
| 17.55 | 5.86 | 6 |
| 22.37 | 4.61 | 26 |
| 23.43 | 4.41 | 7 |
| 26.29 | 3.93 | 31 |
| 28.27 | 3.66 | 12 |
| 29.76 | 3.48 | 16 |
| 31.63 | 3.28 | 3 |
| 32.57 | 3.19 | 22 |
| 33.88 | 3.07 | 17 |
| 35.77 | 2.91 | 22 |
| 39.37 | 2.66 | 17 |
| 39.81 | 2.63 | 9 |
| 41.72 | 2.51 | 4 |
| 42.30 | 2.48 | 6 |
| 43.30 | 2.42 | 6 |
| 45.70 | 2.30 | 3 |
| 46.34 | 2.27 | 3 |
| 48.03 | 2.20 | 10 |
| 52.00 | 2.04 | 2 |
| 56.82 | 1.88 | 6 |
| 60.06 | 1.79 | 3 |
| 62.20 | 1.73 | 3 |
| 63.80 | 1.69 | 5 |
| 69.07 | 1.58 | 3 |
| 71.45 | 1.53 | 5 |
| 84.96 | 1.32 | 3 |
| 86.30 | 1.31 | 3 |

TABLE 2.—POTASSIUM ZEOLITE UJ (EXAMPLE II)

| Bragg Angle, $2\theta$ | Interplanar Spacing, $d(A.)$ | Relative Intensity |
|---|---|---|
| 6.35 | 16.15 | VS |
| 13.65 | 7.53 | MW |
| 17.05 | 6.03 | M |
| 17.75 | 5.80 | W |
| 22.45 | 4.69 | S |
| 23.45 | 4.40 | W |
| 26.35 | 3.92 | S |
| 28.30 | 3.66 | M |
| 29.80 | 3.48 | MS |
| 31.60 | 3.28 | W |
| 32.70 | 3.18 | S |
| 33.90 | 3.07 | M |
| 35.75 | 2.91 | MS |
| 39.30 | 2.66 | M |
| 43.35 | 2.42 | W |
| 48.05 | 2.20 | M |
| 52.05 | 2.04 | W |
| 56.85 | 1.88 | MW |
| 63.85 | 1.69 | W |
| 67.10 | 1.62 | W |
| 69.05 | 1.58 | W |
| 71.40 | 1.53 | MW |

VS=Very Strong. S=Strong. M=Medium. W=Weak.

TABLE 3.—HYDROGEN ZEOLITE UJ (EXAMPLE IV)

| Bragg Angle, $2\theta$ | Interplanar Spacing, $d(A.)$ | Relative Intensity, 100 $I/I_o$ |
|---|---|---|
| 6.22 | 16.48 | 100 |
| 13.45 | 7.64 | 12 |
| 16.85 | 6.10 | 18 |
| 17.28 | 5.95 | 11 |
| 22.20 | 4.65 | 24 |
| 23.35 | 4.42 | 9 |
| 26.10 | 3.96 | 19 |
| 28.03 | 3.69 | 12 |
| 29.47 | 3.52 | 15 |
| 31.32 | 3.31 | 10 |
| 32.36 | 3.21 | 12 |
| 33.63 | 3.09 | 13 |
| 35.52 | 2.93 | 17 |
| 39.10 | 2.67 | 10 |
| 39.60 | 2.64 | 5 |
| 41.58 | 2.52 | 3 |
| 42.02 | 2.50 | 3 |
| 42.96 | 2.44 | 3 |
| 45.50 | 2.31 | 2 |
| 47.74 | 2.21 | 5 |
| 51.80 | 2.05 | 2 |
| 56.45 | 1.89 | 3 |
| 58.50 | 1.83 | 2 |
| 59.75 | 1.80 | 1 |
| 61.90 | 1.74 | 1 |
| 63.50 | 1.70 | 1 |
| 68.84 | 1.58 | 2 |
| 71.20 | 1.54 | 3 |
| 84.60 | 1.33 | 3 |
| 85.90 | 1.31 | 3 |

TABLE 4.—CALCIUM ZEOLITE UJ (EXAMPLE V)

| Bragg Angle, $2\theta$ | Interplanar Spacing, $d(A.)$ | Relative Intensity, 100 $I/I_o$ |
|---|---|---|
| 5.40 | 16.35 | 100 |
| 6.80 | 13.00 | 12 |
| 11.75 | 7.53 | 27 |
| 14.62 | 6.05 | 30 |
| 15.15 | 5.84 | 21 |
| 19.20 | 4.62 | 42 |
| 20.37 | 4.36 | 21 |
| 22.63 | 3.92 | 39 |
| 24.38 | 3.65 | 27 |
| 25.60 | 3.48 | 27 |
| 27.04 | 3.29 | 18 |
| 27.93 | 3.19 | 40 |
| 29.16 | 3.06 | 34 |
| 30.75 | 2.91 | 36 |
| 33.67 | 2.66 | 22 |
| 39.20 | 2.30 | 22 |
| 41.30 | 2.18 | 20 |
| 43.25 | 2.09 | 11 |
| 48.66 | 1.87 | 9 |
| 58.50 | 1.58 | 5 |
| 60.40 | 1.53 | 6 |

As can be seen from the above, the more significant $d$ values for zeolite UJ are as given below in Table 5.

TABLE 5.—MAJOR DIFFRACTION LINES OF ZEOLITE UJ

| Interplanar spacing, $d$(A.) | Relative intensity |
|---|---|
| 16.25±0.25 | VS |
| 7.55±0.15 | M |
| 6.05±0.10 | M |
| 5.91±0.10 | W |
| 4.61±0.05 | S |
| 3.93±0.05 | S |
| 3.67±0.05 | W |
| 3.49±0.05 | M |
| 3.29±0.05 | W |
| 3.19±0.05 | M |
| 3.07±0.05 | M |
| 2.92±0.05 | M |
| 2.66±0.05 | W |

VS=Very strong   M=Medium
S=Strong         W=Weak

As is well known in the art of the X-ray crystallography of powders, there is always some variation in the interplanar spacing and relative intensities of the X-ray diffraction pattern. Among the factors influencing the pattern are impurities in the sample, temperature of the sample, the apparatus employed, the particular radiation source used, the crystal orientation, and other variables found in the art of X-ray diffraction. However, these minor variations in either "$d$" or "100 $I/I_o$" do not interfere with the clear identification of zeolite UJ. It is to be understood that materials which do not show every X-ray line in Tables 1–5, or show X-ray lines in addition to those of Tables 1–5, or show changes in interplanar spacing or relative intensity of the X-ray lines set forth above in Tables 1–5, are to be included under the general classification of materials as set forth above as the zeolite UJ of this invention.

The partially dehydrated zeolite UJ of this invention can be utilized as a selective adsorbent in numerous gas or liquid separation processes wherein a selectively adsorbed material is separated from a less selectively adsorbed material in admixture therewith. In adsorption processing with zeolite UJ, the feed mixture is contacted with the partially dehydrated zeolite UJ in either the vapor or liquid phase. The adsorption pressure is usually near atmospheric, but can be either sub-atmospheric or super-atmospheric. In general the adsorption is carried out at a temperature between about 0° F. and about 800° F., preferably between about 100° F. and 700° F., and at pressures between about atmospheric and about 1,000 p.s.i.g., preferably between 0 p.s.i.g. and about 100 p.s.i.g.

The zeolite UJ adsorbent of this invention is broadly applicable to the separation of any fluid mixture comprising at least two materials having different adsorptivities on zeolite UJ. For example, the aromatic compounds which can be resolved by the process of this invention are mixtures of isomers such as the isomers of xylene, C9 aromatic hydrocarbon isomers, alpha and beta methyl naphthalene, dimenthyl naphthalenes, chlorotoluenes, bromotoluenes, dibromobenzenes, dichlorotoluenes, cresols, methylpyridines, dimethylpyridines, trimethylpyridines, quinoline and isoquinoline, anthracene and phenanthrene, methylquinolines, methylisoquinolines, dimethylquinolines, and dimethylisoquinolines. Other typical uses of a zeolite UJ adsorbent might include resolving cyclohexane and other naphthenes from paraffins and isoparaffins, and paraffins from isoparaffins. Zeolite UJ is also useful for the adsorptive separation of water from gas and liquid streams, and in the removal of nitrogen compounds from hydrocarbons such as petroleum hydrocarbons.

The products of the adsorptive contacting of a feed mixture with zeolite UJ are an unadsorbed or raffinate phase which is lean in the more readily adsorbed component of the feed mixture and rich in the less readily adsorbed component, and a solid rich zeolite UJ adsorbent containing an adsorbate rich in the more readily adsorbed component of the feed mixture and lean in the less readily adsorbed component. The rich solid adsorbent and the unadsorbed phase are separated, and the latter is usually passed to storage as one of the products of the process. The rich zeolite UJ adsorbent on the other hand is treated to remove or desorb the adsorbate therefrom and to return the adsorbent to a lean state for reuse.

Typical adsorptive characteristics of zeolite UJ are illustrated below in Examples VI, VII, and VIII wherein the percentages are by volume unless otherwise specified.

*Example VI*

A 2 ml. liquid feed mixture of xylene isomers comprising 48.8 percent meta-xylene and 51.2 percent para-xylene was circulated in the vapor phase for a period of about 0.2 hour through an 8.5 gram partially dehydrated (calcined 2 hrs. at 700° F.) potassium zeolite UJ adsorbent bed at about 200° C. and atmospheric pressure. The unadsorbed phase, having a liquid volume of about 1 ml., was found to contain about 46.9 percent meta-xylene and about 53.1 percent para-xylene. The adsorbed material on the zeolite UJ adsorbent comprised about 50.7 precent meta-xylene and about 49.3 percent para-xylene. This equilibrium data indicates a separation factor between these xylene isomers of about 1.16 with meta-xylene being preferentially adsorbed. The weight of benzene also adsorbed at the conditions of this example is equivalent to a volume of about 1 ml. of liquid benzene for every 8 grams of potassium zeolite UJ.

*Example VII*

A liquid feed volume of about 2 ml. of a mixture of 49.8 percent mesitylene and 50.2 percent pseudocumene was circulated for a period of about 0.2 hour through an 8.7 gram adsorbent bed of partially dehydrated (calcined 2 hrs. at 700° F.) potassium zeolite UJ adsorbent at about 200° C. and atmospheric pressure. The unadsorbed phase, comprising a liquid volume of about 0.8 ml., was found to contain about 59.0 percent mesitylene and about 41.0 percent pseudocumene. The adsorbed material comprised about 43.7 percent mesitylene and about 56.3 percent pseudocumene. The above equilibrium data indicates a separation factor between pseudocumene and mesitylene of about 1.85 with pseudocumene being selectively adsorbed. The pore diameters of potassium zeolite UJ are, therefore, larger than the critical dimension of mesitylene (about 8.2 Angstrom units), since mesitylene is adsorbed on potassium zeolite UJ as well as pseudocumene.

*Example VIII*

A sample of fully hydrated crystalline potassium zeolite UJ, prepared in the same manner as in Example I, was air dried at room temperature by passing air through the crystalline zeolite filter cake. A portion of this air dried zeolite UJ was then weighed, calcined at about 1,112° F., and reweighed. Water, amounting to approximately 12.3 percent by weight of the sample, was lost by this calcining at 1,112° F. Another portion of the air dried zeolite UJ was calcined at about 212° F. for about 2 hours. Then, when this 212° F. calcined zeolite UJ was weighed, further calcined at about 1,112° F. for about 2 hours and reweighed, there was a moisture loss of about 5.9 percent by weight. A third portion of the air dried zeolite UJ was calcined at 700° F. for about 2 hours. This 700° F. calcined portion was then weighed, calcined at 1,112° F. for about 2 hours and upon reweighing showed a water loss of about 3.4 percent by weight. The approximate analysis of this potassium zeolite UJ, expressed as mole ratios of oxides, was

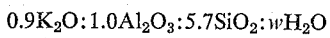

$$0.9K_2O:1.0Al_2O_3:5.7SiO_2:wH_2O$$

On this mole ratio basis, the value of $w$ in the above formula was about 4.1 upon air drying at room temperature, about 1.8 upon drying at 212° F., and about 1.0 upon drying at 700° F. These calcined samples readily regain their moisture contents when exposed to water vapors. Thus, zeolite UJ apparently has a capacity for water similar to other crystalline zeolitic alumino silicates.

The removal of adsorbates from zeolite UJ includes desorptive techniques such as subjecting the rich adsorbent to an elevated temperature, or to a reduced pressure, or to contacting with a stripping gas or a displacement exchange fluid, or to any combination of the above. In accordance with a preferred mode of desorption, the rich zeolite UJ adsorbent is treated with a suitable displacement exchange fluid at approximately the same temperature and pressure as that employed in the initial adsorption step. The displacement exchange fluid can be any material which is inert with respect to zeolite UJ and the feed mixture, which is adsorbable by zeolite UJ, and which is readily separated from the components of the feed mixture by distillation, chilling, adsorption, or other conventional means. Preferably, the displacement exchange fluid is one which has a boiling point substantially outside the boiling range of the feed mixture and which has an adsorbability substantially the same as that of the adsorbed components of the feed mixture.

The optimum particle size of the crystalline zeolite UJ when used as either an adsorbent or catalyst depends upon the manner in which it is used in the process, i.e., as a fixed compact bed, a moving compact bed, a fluidized bed, etc., but is usually between about 2 and about 400 mesh, preferably between about 4 and about 30 mesh for fixed and moving compact beds and between about 100 and about 300 mesh for fluidized beds.

As an adsorbent, zeolite UJ is preferably employed in the form of a dense compact fixed or moving bed which is alternately contacted with the feed and then desorbed. In the simplest embodiment of the invention, the adsorbent is employed in the form of a single static bed, in which case the process is only semi-continuous. Preferably a set of two or more static beds is employed in fixed bed contacting with appropriate valving so that the feed stream is passed through one or more adsorbent beds while the desorption is carried out in one or more other beds in the set. The direction of flow during adsorption and desorption can be either up or down through the adsorbent, but preferably the adsorption is carried out in one flow direction and the desorption in the other. Any of the conventional apparatus employed in static bed fluid-solids contacting can be used.

The various forms of the UJ crystal are also of use for catalysts in the various catalytic reactions including hydrocarbon conversions. The hydrogen UJ and also the metals of Group VIII and Group VIB of the Periodic Table are particularly useful for these purposes. For such purposes the metal may be introduced into the cation positions of the crystal by the methods set forth in Example V herein. Examples of such metals include iron, cobalt, nickel, chromium, vanadium, platinum, rhodium, palladium, and the like. In addition, the metallo or hydrogen forms of the UJ crystal may be used in admixture with the oxides, sulfides, halides, etc. of these metals. Additionally, such materials as boron trifluoride, titanium fluoride, hydrogen chloride, hydrogen fluoride, organic fluorides, chloroplatinic acid, palladium chloride, and the like may be employed as promoters.

The reactions which are catalyzed by these various forms of the UJ crystal include isomerization, hydrogenation, dehydrogenation, alkylation, dealkylation, sulfurization, desulfurization, denitrogenation, esterification, hydrolysis, hydration, dehydration, reforming, and the like.

For these and other catalytic purposes the crystal may or may not be supported as desired. Suitable supports include alumina, silica gel, magnesia, montmorillonite, corundum, zinc oxide, zirconium oxide, chromium oxide, ferric oxide, zinc phosphate, aluminum phosphate, ferric phosphate, zirconium phosphate, and the like. In one modification the crystal is mixed with the support or supports and is copelleted, or is mixed with a binder and extruded. Alternatively, the UJ crystal may be formed, washed, ion exchanged where so desired, and the wet crystals mixed with the gelled support and dried and pelleted. This procedure facilitates the washing and handling of the finely divided fresh UJ crystal and also insures a fine dispersion of the UJ crystal in the support. For example, the newly formed potassium UJ may be mixed with the gel form of alumina gel and the combination may be ion exchanged with cobalt, iron, or nickel salts to form the corresponding cobalt, iron or nickel UJ crystal dispersed in alumina gel, and the latter mixture can be washed, dried and pelleted to yield the supported metallo UJ crystal.

A particularly useful hydrocarbon conversion which is catalyzed by the UJ crystal, and in particular the hydrogen form of the UJ crystal is hydrocracking. In hydrocracking a hydrocarbon oil, or an oil consisting predominantly of hydrocarbons, is subjected to the action of the catalyst in the presence of hydrogen to cause scission of the carbon-carbon bonds and hydrogeneration of the fragments. The reaction is conducted primarily for the purpose of lowering the boiling range of the stock. Stocks employed include shale oil, petroleum oil, synthetic oils, coal tar oils, and other hydrocarbonaceous fluids. The boiling range of the stock may be any suitable range such as 400° F.+. It is normally preferable to use distilled stocks, and preferably in the boiling range of about 400°–900° F.

In conducting the hydrocracking reaction over the UJ crystal, the pressure may be any suitable pressure above about 50 p.s.i.g. and preferably in the range of 500–10,000 p.s.i.g. A particularly suitable pressure is around 1,500 p.s.i.g. The temperature of the conversion zone may be anywhere in the range of about 400°–1,000° F. The preferred temperature range is 500°–700° F. The liquid hourly space velocity may be anywhere in the range of about 0.1 to 10 and preferably in the range of 0.5 to 1.0. Hydrogen gas is recycled in amounts of 1,000 to 10,000 cu. ft. per bbl. of feed. Prior to contacting hydrocarbons the catalyst may be presulfided such as by passing hydrogen sulfide with hydrogen through the bed with progressive increases in temperature. Alternatively, the sulfiding operation may be completed by passing a sulfur containing gasoline with hydrogen gas at temperatures in the range of 500°–700° F. In certain instances the addition of minor amounts of water along with the hydrocracking feed may be desirable. Such water may correspond to that normally incident in the oil saturated with water at room temperature up to 2 percent by volume based on the charge stock.

The following example illustrates the application of this crystal as a catalyst in hydrocracking:

Example IX

A 400°–550° F. boiling range gas oil from a refinery cracking operation is subjected to the following conditions of operation where the catalyst is diluted with inert corundum for heat control in the ratio of 1 volume of catalyst to 10 volumes of corundum.

| | |
|---|---|
| Catalyst | Hydrogen UJ |
| Temperature, °F. | 550 |
| Pressure, p.s.i.g. | 1,500 |
| Space velocity, ml./ml./hr. | 1.0 |
| Added hydrogen, cu. ft./bbl. | 10,000 |

The yield of gasoline boiling below 400° F. is about 45 percent.

Hydrocracking, as well as any of the other catalytic reactions using zeolite UJ, may be conducted in one or more stages, each with or without the removal of all or some of the diluents and/or reaction products. In modifications of this type of operation, hydrogen sulfide and/or hydrogen may be added and/or removed between stages to control catalyst activity, catalyst life, temperature of reaction, or other process variables. It is often desirable to remove interstagewise, ammonia which is formed by the denitrogenation of trace nitrogen components in the feed stock. Since it is generally desirable to severely restrict the nitrogen in the feedstock, this quantity of ammonia will normally be very small in any event. Furthermore, any or all of the unconverted and/or partially converted material may be recycled to extinction or otherwise.

In hydrocracking, as in other catalytic reactions, zeolite UJ catalysts may be used in one stage or a series of reaction stages where other catalysts are used in some or all of such other stages. Thus, for example, the incoming feed to hydrocracking may be subjected to preliminary hydrogenation over a suitable catalyst, e.g., cobalt molybdate on alumina, in order to control the amount of nitrogen and/or sulfur in the feed to hydrocracking by such pretreatment. Or, for example, the stock may be pre-saturated with hydrogen such as by hydrogenation over a nickel, platinum, or other catalyst, supported or otherwise. Or, the stock for hydrocracking may be partially hydrocracked over some other catalyst and fiinally hydrocracked over the zeolite UJ catalysts of this invention.

Normal paraffins such as n-butane, n-pentane, n-hexane, and n-heptane may be isomerized over zeolite UJ and particularly over the hydrogen UJ form. This type of reaction is carried out at temperatures in the range of 100° F. to 1,100° F., and preferably in the range of 200°–600° F. to favor isomer formation. Suitable pressures for isomerization are in the range of 0–2,000 p.s.i.g. In the case of isomerization, promoters such as boron trifluoride, hydrogen fluoride, hydrogen chloride, and the like may be included with feed or periodically introduced. Liquid hourly space velocities for isomerization are in the range of 0.1 to 10.0. Although the foregoing disclosure is directed toward the isomerization of n-paraffins, mixtures of low octane stocks may be subjected to isomerization over zeolite UJ to yield higher octane products.

Dealkylation reactions are catalyzed by zeolite UJ, and particularly by hydrogen UJ. Such dealkylation reactions include the dealkylation of alkylated benzenes, and naphthalenes to lower molecular weight forms. For example, hydrogen UJ may be used to dealkylate toluene to benzene or methyl and/or dimethylnaphthalenes to naphthalenes and/or methyl naphthalenes. Catalysts employed under the above description of hydrocracking are advantaegously employed herein. Temperatures suitable for these reactions are generally in the range of 700°–1,200° F. Liquid hourly space velocities should be in the range of 0.1 to 10.0 such as about 1.0. Suitable pressures for dealkylation are in the range of 0 to 500 p.s.i.g. such as about 300 p.s.i.g. for example. Recycle hydrogen should normally be employed for recycle in the range of about 100 to 3,000 cu. ft. per bbl. of charge stock.

The UJ zeolite may also be used to catalyze reforming operations. For example, gasoline stocks may be advantageously reformed over the hydrogen UJ zeolite. Stocks for reforming should be pre-refined to remove nitrogen and/or sulfur contents. The reaction conditions suitable for reforming are generally those set forth under the dealkylation description hereinbefore.

In any of the foregoing catalytic operations the UJ zeolite will normally lose catalytic activity during usage due to the deposit of carbonaceous materials. The activity of the catalyst in this event can be at least partially restored by the controlled combustion of such deposits in the manner commonly used through the industry for catalyst regenerations. During such regenerations with diluted air, it is desirable to keep the temperature below about 1,050° F. and preferably below about 1,000° F. to prevent unnecessary destruction of the crystal form. Although the deactivation of zeolite UJ when used as an adsorbent is gradual, some deactivation can eventually occur. It is, therefore, within the scope of this invention to regenerate deactivated crystalline zeolite UJ from adsorption processing by occasional contacting with hot reactivating gases such as flue gas, air, etc. at temperatures usually between about 800° F. and 1,200° F. or by other suitable means.

Since the use of the crystalline zeolite UJ of this invention usually entails a conventional solids-fluid contacting operation, any of the various techniques and equipment conventionally applied to such type of operation can be adapted to the practice of the use of zeolite UJ without departure from the scope thereof. Thus, it is often preferred to maintain the zeolite UJ in the form of a moving bed, e.g., as a solids-fluid contacting operation in which a compact bed of zeolite UJ is passed successively through adsorption and desorption zones where it is concurrently or countercurrently contacted with the feed stream. However, the process is also effective and operable when the zeolite UJ is maintained in the form of a fixed compact bed. Also, the solids-fluid contacting operation can be carried out employing fluidizing techniques whereby the zeolite UJ is employed in relatively small particle size and is suspended by the flow of the fluid with which it is contacting.

Various other changes and modifications of this invention are apparent from the description of this invention and further modifications will be obvious to those skilled in the art. Such modifications and changes are intended to be included within the scope of this invention as defined by the following claims.

I claim:

1. A process for synthesizing a crystalline zeolite having a composition, expressed as mole ratios of oxides, corresponding to $$0.9 \pm 0.2 R_{2/v}O : Al_2O_3 : 5.0 \pm 1.5 SiO_2 : wH_2O$$

wherein R represents at least one cation having a valence of not more than 4, $v$ represents the valence of R, and $w$ can be any value up to about 5, said zeolite having an X-ray powder diffraction pattern essentially as shown in the following table,

| Interplanar spacing, $d$(A.): | Relative intensity |
|---|---|
| 16.25±0.25 | VS |
| 7.55±0.15 | M |
| 6.50±0.10 | M |
| 5.91±0.10 | W |
| 4.61±0.05 | S |
| 3.93±0.05 | S |
| 3.67±0.05 | W |
| 3.49±0.05 | M |
| 3.29±0.05 | W |
| 3.19±0.05 | M |
| 3.07±0.05 | M |
| 2.92±0.05 | M |
| 2.66±0.05 | W | which process comprises: preparing an aqueous reactant solution having a composition, expressed as mole ratios of oxides, corresponding to $SiO_2/Al_2O_3$ of from about 6 to about 30,
$R_{2/v}O/SiO_2$ of from about 0.30 to about 0.70, and
$H_2O/R_{2/v}O$ of from about 80 to about 140;

and maintaining said reactant solution at a temperature between about 150° F. and about 325° F. until said zeolite crystals are formed.

2. A process as defined in claim 1 wherein R represents at least one exchangeable cation selected from the group consisting of ammonium, hydrogen, metal ions of Group I and Group II of the Periodic Table, and metal ions of the transition metals of the Periodic Table.

3. A method of preparing a crystalline potassium-aluminum-silicate having an X-ray powder diffraction pattern essentially as shown in the following table,

| Interplanar spacing, $d$(A.) | Relative intensity |
|---|---|
| 16.25±0.25 | VS |
| 7.55±0.15 | M |
| 6.05±0.10 | M |
| 5.91±0.10 | W |
| 4.61±0.05 | S |
| 3.93±0.05 | S |
| 3.67±0.05 | W |
| 3.49±0.05 | M |
| 3.29±0.05 | W |
| 3.19±0.05 | M |
| 3.07±0.05 | M |
| 2.92±0.05 | M |
| 2.66±0.05 | W | which method comprises: preparing an aqueous potassium-aluminum-silicate reactant mixture having a composition, expressed as mole ratios of oxides, corresponding to $SiO_2/Al_2O_3$ of from about 6 to about 30,
$K_2O/SiO_2$ of from about 0.30 to about 0.70, and
$H_2O/K_2O$ of from about 80 to about 140; and maintaining said mixture at a temperature between about 150° F. and about 325° F. until said potassium-aluminum-silicate crystals are formed in the reactant mother liquor.

4. A method as defined in claim 3 wherein said mixture is maintained at a temperature between about 170° F. and about 200° F. until said silicate crystals are formed.

5. A method as defined in claim 3 wherein said aqueous potassium-aluminum-silicate reactant mixture has a composition, expressed as mole ratios of oxides, corresponding to $SiO_2/Al_2O_3$ of from about 7 to about 21,
$K_2O/SiO_2$ of from about 0.45 to about 0.65, and
$H_2O/K_2O$ of from about 95 to about 120.

6. A method as defined in claim 3 wherein said crystalline potassium-aluminum-silicate has a composition, expressed as mole ratios of oxides, corresponding to $$0.9 \pm 0.2 K_2O : Al_2O_3 : 5.0 \pm 1.5 SiO_2 : wH_2O$$

wherein $w$ is any value from 0 to about 5.

7. A method as defined in claim 3 including the additional step of separating said silicate crystals from the reactant mother liquor.

8. A method as defined in claim 7 including the additional step of washing said separated silicate crystals with water until the wash water has a pH of between about 9 and about 12.

9. A method as defined in claim 3 wherein said aqueous potassium-aluminum-silicate reactant mixture is prepared by admixing an aqueous solution of potassium aluminate and an aqueous solution of potassium silicate.

10. A method as defined in claim 3 wherein said aqueous potassium-aluminum-silicate reactant mixture is prepared by reacting aqueous potassium hydroxide with aluminum to form an aqueous solution of potassium aluminate and admixing said solution of potassium aluminate with an aqueous solution of potassium silicate.

References Cited by the Examiner

UNITED STATES PATENTS

| 2,971,903 | 2/1961 | Kimberlin et al. | 208—119 |
| 2,971,904 | 2/1961 | Gladrow et al. | 208—120 |
| 2,983,670 | 5/1961 | Senbold | 208—110 |
| 2,995,423 | 8/1961 | Breck et al. | 23—113 |
| 2,996,358 | 8/1961 | Milton | 23—113 |
| 3,011,869 | 12/1961 | Breck et al. | 23—113 |
| 3,033,778 | 5/1962 | Frilette | 208—120 |
| 3,216,789 | 11/1965 | Breck et al. | 23—113 |

FOREIGN PATENTS

| 1,098,929 | 2/1961 | Germany. |
| 828,777 | 2/1960 | Great Britain. |

OSCAR R. VERTIZ, *Primary Examiner.*

ALPHONSO D. SULLIVAN, DANIEL E. WYMAN, BENJAMIN HENKINJ, *Examiners.*

MILTON WEISSMAN, A. RIMENS, E. J. MEROS,
*Assistant Examiners.*